(12) United States Patent
Cosserat et al.

(10) Patent No.: US 11,070,387 B2
(45) Date of Patent: Jul. 20, 2021

(54) METHOD FOR RECORDING A CENTRAL CONTROL UNIT BELONGING TO A HOME-AUTOMATION FACILITY

(71) Applicant: SOMFY SAS, Cluses (FR)

(72) Inventors: Hubert Cosserat, Annemasse (FR); Florent Michel, Chomerac (FR)

(73) Assignee: SOMFY SAS, Cluses (FR)

( * ) Notice: Subject to any disclaimer, the term of this patent is extended or adjusted under 35 U.S.C. 154(b) by 79 days.

(21) Appl. No.: 15/740,699

(22) PCT Filed: Jun. 30, 2016

(86) PCT No.: PCT/FR2016/051634
§ 371 (c)(1),
(2) Date: Jun. 4, 2018

(87) PCT Pub. No.: WO2017/006021
PCT Pub. Date: Jan. 12, 2017

(65) Prior Publication Data
US 2018/0287813 A1   Oct. 4, 2018

(30) Foreign Application Priority Data
Jul. 3, 2015   (FR) ...................... 15/56295

(51) Int. Cl.
*H04W 76/10*   (2018.01)
*H04L 12/28*   (2006.01)
(Continued)

(52) U.S. Cl.
CPC .......... *H04L 12/2807* (2013.01); *G08C 17/02* (2013.01); *H04L 12/2816* (2013.01);
(Continued)

(58) Field of Classification Search
CPC ..... H04W 84/18; H04W 76/10; H04W 8/005; H04W 60/00; H04L 41/12; H04L 45/02;
(Continued)

(56) References Cited
U.S. PATENT DOCUMENTS 5,500,934 A    3/1996 Austin et al.
8,374,104 B2 * 2/2013 Gauweiler ........ H04L 29/12254
                                                   370/255
(Continued)

OTHER PUBLICATIONS

International Search Report for International Application No. PCT/FR2016/051634 dated Oct. 31, 2016 (2 pgs).
(Continued)

*Primary Examiner* — Michael J Moore, Jr.
*Assistant Examiner* — Prenell P Jones
(74) *Attorney, Agent, or Firm* — Cantor Colburn LLP

(57) ABSTRACT

The present invention concerns a method for recording a central control unit (U) belonging to a home-automation facility (17); the method being executed by a user terminal (T) and comprising the following steps: establishing (ELRT2) a connection between the user terminal (T) and at least one central control unit (U); creating (ELRT3) a facility identifier (StID); sending (ELRT4) a discovery message (MD); receiving (ELRT5, ELRT8) at least one signalling message (MLRSU) transmitted by at least one central control unit (U, U1, U2) for the facility (17) linked with a unique identifier (UID) of said central control unit (U, U1, U2), recording (ELRT6, ELRT9) an attachment of the at least one identifier (UID) of the at least one central control unit (U, U1, U2) to the identifier of the facility (StID).

15 Claims, 5 Drawing Sheets

(51) Int. Cl.
- *G08C 17/02* (2006.01)
- *H04W 8/00* (2009.01)
- *H04W 60/00* (2009.01)
- *H05B 47/10* (2020.01)

(52) U.S. Cl.
CPC ...... *H04L 12/2821* (2013.01); *H04L 12/2838* (2013.01); *H04W 8/005* (2013.01); *H04W 60/00* (2013.01); *H04W 76/10* (2018.02); *G08C 2201/41* (2013.01); *G08C 2201/93* (2013.01); *H04L 2012/285* (2013.01); *H05B 47/10* (2020.01)

(58) Field of Classification Search
CPC ......... H04L 45/00; H04L 45/04; H04L 41/04; H04L 12/2807; H04L 2012/285; H04L 12/2821; H04L 12/2816; H04L 12/2838; G08C 2201/93; G08C 2201/41; G08C 17/02; H05B 47/10

See application file for complete search history.

(56) References Cited

U.S. PATENT DOCUMENTS

| | | |
|---|---|---|
| 8,548,607 B1 | 10/2013 | Belz et al. |
| 8,825,832 B2 | 9/2014 | Whipple et al. |
| 9,661,674 B2 | 5/2017 | Su |
| 9,898,175 B2 | 2/2018 | Fiedler |
| 2002/0013150 A1* | 1/2002 | McKenna ............ H01Q 1/246 455/430 |
| 2002/0198951 A1 | 12/2002 | Thurlow et al. |
| 2005/0005242 A1 | 1/2005 | Hoyle |
| 2005/0021852 A1 | 1/2005 | Accarie et al. |
| 2005/0044225 A1 | 2/2005 | Ota et al. |
| 2005/0055108 A1 | 3/2005 | Gonzales et al. |
| 2005/0130611 A1 | 6/2005 | Lu et al. |
| 2005/0198261 A1* | 9/2005 | Durvasula ............ H04L 47/724 709/224 |
| 2005/0258976 A1 | 11/2005 | Zteng |
| 2006/0133392 A1 | 6/2006 | Ajitomi et al. |
| 2006/0250578 A1 | 11/2006 | Pohl et al. |
| 2007/0104164 A1* | 5/2007 | Laroia ................. H04B 17/345 370/338 |
| 2007/0140168 A1* | 6/2007 | Laroia .................. H04W 24/08 370/330 |
| 2007/0158335 A1 | 7/2007 | Mansbery |
| 2007/0208782 A1* | 9/2007 | Carter ....................... G06F 8/65 |
| 2007/0258718 A1 | 11/2007 | Furlong et al. |
| 2008/0113665 A1 | 5/2008 | Paas et al. |
| 2008/0281971 A1* | 11/2008 | Leppanen ........... H04L 12/1818 709/228 |
| 2009/0094317 A1* | 4/2009 | Venkitaraman ... H04L 29/12311 709/203 |
| 2009/0117848 A1* | 5/2009 | Nagata .................. H04W 8/005 455/41.2 |
| 2009/0217335 A1 | 8/2009 | Wong et al. |
| 2009/0287529 A1 | 11/2009 | Johnson |
| 2010/0146396 A1 | 6/2010 | Able et al. |
| 2010/0332994 A1 | 12/2010 | Istvan et al. |
| 2011/0184561 A1 | 7/2011 | Klasson et al. |
| 2011/0280175 A1 | 11/2011 | Yamada et al. |
| 2012/0002589 A1* | 1/2012 | Saifullah ............... H04W 36/38 370/315 |
| 2012/0088525 A1* | 4/2012 | Kurokawa ............ H04W 4/029 455/456.5 |
| 2012/0235579 A1 | 9/2012 | Chemel et al. |
| 2012/0296451 A1 | 11/2012 | Kaps et al. |
| 2012/0312874 A1 | 12/2012 | Jonsson |
| 2012/0331156 A1* | 12/2012 | Colpitts ............ H04W 12/0804 709/227 |
| 2013/0215116 A1 | 6/2013 | Siddique et al. |
| 2013/0286892 A1* | 10/2013 | Fuste Vilella .......... H04L 45/02 370/254 |
| 2013/0337769 A1* | 12/2013 | Bhatia ............... H04M 15/8016 455/406 |
| 2014/0040435 A1* | 2/2014 | Ylimartimo ........ H04L 12/2818 709/219 |
| 2014/0064209 A1 | 3/2014 | Anchan et al. |
| 2014/0153489 A1 | 6/2014 | Perras et al. |
| 2014/0159879 A1 | 6/2014 | Rezvani et al. |
| 2014/0172176 A1 | 6/2014 | Deilmann et al. |
| 2015/0012463 A1 | 1/2015 | Rosenthal |
| 2015/0012646 A1 | 1/2015 | Yang et al. |
| 2015/0048162 A1 | 2/2015 | Jonsson |
| 2015/0156031 A1 | 6/2015 | Fadell et al. |
| 2015/0163119 A1 | 6/2015 | Dupre et al. |
| 2015/0200787 A1 | 7/2015 | Slupik et al. |
| 2015/0208454 A1* | 7/2015 | Cho ....................... H04W 8/005 370/329 |
| 2016/0021502 A1 | 1/2016 | Kim et al. |
| 2016/0061132 A1 | 3/2016 | Hieda |
| 2016/0072781 A1 | 3/2016 | Zhang et al. |
| 2016/0073274 A1* | 3/2016 | Burley .................. H04W 24/02 455/422.1 |
| 2016/0080232 A1 | 3/2016 | Dupre et al. |
| 2016/0098309 A1 | 4/2016 | Kim |
| 2016/0098468 A1 | 4/2016 | Logue et al. |
| 2016/0099826 A1 | 4/2016 | Logue et al. |
| 2016/0099830 A1 | 4/2016 | Stellick |
| 2016/0099866 A1 | 4/2016 | Stellick |
| 2016/0100305 A1* | 4/2016 | Karampatsis ........... H04L 63/08 370/328 |
| 2016/0112870 A1 | 4/2016 | Pathuri |
| 2016/0165663 A1* | 6/2016 | Shanmugam ......... H04W 76/10 370/338 |
| 2016/0227471 A1* | 8/2016 | De Foy ............... H04L 12/4633 |
| 2016/0262200 A1 | 9/2016 | Su |
| 2017/0079086 A1 | 3/2017 | Kuge et al. |
| 2017/0332288 A1 | 11/2017 | Sadek et al. |
| 2018/0091391 A1* | 3/2018 | Turow .................... G06F 16/23 |
| 2018/0270075 A1 | 9/2018 | Cosserat et al. |
| 2018/0294989 A1 | 10/2018 | Cosserat et al. |
| 2020/0020353 A1 | 1/2020 | Levy-Rosenthal |

OTHER PUBLICATIONS

International Search Report for International Application No. PCT/FR2016/051637 dated Oct. 31, 2016.
International Search Report for International Application No. PCT/FR2016/051632 dated Sep. 28, 2016.
Written Opinion for International Application No. PCT/FR2016/051637 dated Oct. 31, 2016.
Written Opinion for International Application No. PCT/FR2016/051632 dated Sep. 23, 2016.
Written Opinion for International Application No. PCT/FR2016/051634 dated Oct. 31, 2016.
U.S. Office Action for U.S. Appl. No. 15/740,689 dated Jul. 9, 2020.
Non-Final Office Action for U.S. Appl. No. 15/740,694, dated Dec. 31, 2020.
EP Office Action for Application No. 16 750 907.4; dated Nov. 6, 2018

* cited by examiner

METHOD FOR RECORDING A CENTRAL CONTROL UNIT BELONGING TO A HOME-AUTOMATION FACILITY

CROSS REFERENCE TO RELATED APPLICATIONS

This application is a National Stage of PCT Application No. PCT/FR2016/051634 filed on Jun. 30, 2016, which claims priority to French Patent Application No. 15/56295 filed on Jul. 3, 2015, the contents each of which are incorporated herein by reference thereto.

TECHNICAL FIELD

The present invention concerns a method for registering a central control unit belonging to a home automation installation.

BACKGROUND

A home automation installation of a building may comprise a plurality of home automation devices. It is known to proceed to the configuration, to the control and/or to the monitoring of said installation using a central control unit which communicates with one or several home automation device(s).

The registration of the central control unit and the configuration of the installation require interacting with the central control unit.

The registration operations may be complicated by the manual input of a serial number or of an identifier, or by the fact that these operations should be carried out without access to a wide area network enabling the access to a remote management unit.

BRIEF SUMMARY

The present invention aims to solve all or part of the drawbacks mentioned above.

To this end, the present invention concerns a method for registering a central control unit belonging to a home automation installation, the method being executed by a user terminal and comprising the following steps:
  i. Establishing a connection between the user terminal and at least one central control unit;
  ii. Creating an installation identifier;
  iii. Sending a discovery message;
  iv. Receiving at least one reporting message emitted by at least one central control unit for the installation in connection with a unique identifier of said central control unit;
  v. Registering an attachment of the at least one identifier of the at least one central control unit to the identifier of the installation.

Thanks to the arrangements according to the invention, the registration or the discovery of the central control unit may be carried out in an automated manner, without any manual input of an installation identifier.

In general, the order in which the steps are presented does not necessarily imply a sequential progress. In particular, the steps i, ii and iii may be interchanged.

The user terminal or mobile communication terminal may be, for example, a smartphone, a laptop or a tablet. The user terminal may contain and execute an application software.

By installation, is meant a set comprising a plurality of home automation devices and a plurality of control units arranged within one single building or on a plurality of locations, each home automation device being connected to an electronic control unit among the plurality of electronic control units, the plurality of electronic control units forming a group under the control of a user. The electronic devices form groups of at least one home automation device attached to an electronic control unit.

The same device or the same control unit may belong to two different installations under the responsibility of two different users. As example, a home automation device corresponding to a heating system may be comprised within a first home automation installation comprising a set of devices comprised within a dwelling, under the control of a user occupying the dwelling, and within a second home automation installation comprising a set of home automation devices corresponding to heating systems arranged in a plurality of dwellings under the control of a user administrator of the heating equipment for the plurality of dwellings.

It is noteworthy that home automation device means a home automation equipment and/or a sensor, or even a home automation equipment portion or a sensor portion corresponding to a functional subset.

A central control unit of a the home automation installation means an electronic unit comprising at least one processing unit for containing and executing at least one computer program, comprising at least one communication module intended for the monitoring and/or control of at least one home automation device and at least one module for communication with a management unit. The electronic unit may be independent or integrated into a home automation device. In this last case, the communication module intended for the monitoring and/or control of the device may be a communication module internal to the home automation device and/or a communication module intended for the monitoring and/or control of other home automation devices. In some applications, a central control unit may communicate with the management unit through an intermediate management unit, for example a third-party service provider, whose intermediate management unit offers a service interface or API.

Message means a data item notified or received in the form a synchronous or asynchronous call, which may also correspond to a local or remote function call.

According to an aspect of the invention, the method further comprises the following step:
  Receiving the at least one topology description message comprising a description of a group of devices attached to the central control unit.
  Registering the group of devices in connection with the identifier of the installation in a group of devices attached to the installation.

According to an aspect of the invention, a topology description message may be combined with a reporting message, or distinct therefrom.

According to an aspect of the invention, the registration method comprises at least the following steps:
  A first step of receiving a first reporting message emitted by a first central control unit for the installation in connection with a first unique identifier of said first central control unit, and
  A second step of receiving a second reporting message emitted by a second central control unit for the installation in connection with a second unique identifier of said second central control unit;
  and at least the following steps:
  A first step of registering an attachment of the first identifier of the first central control unit to the identifier of the installation;

A second step of registering an attachment of the second identifier of the second central control unit to the identifier of the installation;

the identifier of the installation of the home automation installation being associated with a group comprising at least the identifiers of the first central control unit and of the second central control unit.

Thanks to the arrangements according to the invention, it is possible to use several central control units within the same installation in order to extend the number of types of home automation devices or the number of home automation protocols usable in the same installation, or to increase the total number of devices of the installation, while preserving an identification of the affiliation of the different home automation devices to the same installation.

Thus, the interface presented to the user may add an abstraction layer for hiding the actual attachment of the devices to the central control units. Thus, the interface represents the home automation equipment, such as shutters, awnings, HVAC or lighting systems, pilotable within the installation as the sensors in presence.

These arrangements are obtained without any communication between the central control units, but simply by the logical attachment operated during the record.

According to an aspect of the invention, the registration method comprises at least the following steps:

A first step of receiving a first topology description message comprising a description of a first group of devices attached to the first central control unit; and A second step of receiving a second topology description message comprising a description of a second group of devices attached to the second central control unit, and at least the following steps:

A first step of registering the first group of devices in connection with the identifier of the installation in the group of devices attached to the installation; and A second step of registering the second group of devices in connection with the identifier of the installation in the group of devices attached to the installation;

the identifier of the home automation installation being associated with the group of devices grouping together the devices contained within at least the first group of devices attached to the first central control unit and at least the second group of devices attached to the second central control unit.

Thus, the devices are considered to be attached to the same identifier of an installation, in a group which groups together all the devices of the installation attached indifferently to the first or to the second central control unit which may be communicated to a user or to a third-party application.

According to an aspect of the invention, the registration method further comprises the following step:

Sending a message comprising the identifier of the home automation installation to the at least one control unit attached to said identifier, for its registration on the at least one electronic control unit.

According to an aspect of the invention, the identifier of the home automation installation is associated with a group comprising at least one identifier of a user.

According to an aspect of the invention, the registration method further comprises at least the following step:

Sending a registration message to a management unit comprising the identifier of the installation and the at least one identifier of the central control unit.

According to an aspect of the invention, the management unit is a server remotely connected to the at least one home automation installation via a wide area network.

According to another aspect of the invention, the management unit is a central unit intended to be connected to one or more central control unit(s) on separate private or local area networks, or even on the same local area network.

According to an aspect of the invention, the third-party application can be executed, as the case may be, on the user terminal or on the management unit or on another management unit connected to the user terminal or to the management unit executing the control method.

According to an aspect of the invention, the registration method further comprises the following steps:

Sending to a management unit a topology description message comprising a description of a group of devices attached to the identifier of the installation.

According to an aspect of the invention, the registration method further comprises the following step:

Sending a communication request message to the at least one central control unit attached to the identifier of the installation, for the establishment of a communication by said central control unit toward the management unit, in order to communicate to the server at least the identifier of said central control unit and optionally a description of a group of devices attached to the central control unit to a management unit.

According to an aspect of the invention, an information on the attachment of the at least one home automation device to a central control unit is attached to the description information of a device in the group of devices attached to the installation. The storage of this information is provided for the routing of the message toward the concerned central control unit in the case of control by the management unit.

According to an aspect of the invention, the home automation devices are identified in a unique manner by a device identifier comprising an identifier of the central control unit to which said device is attached.

According to an aspect of the invention, the registration method further comprises the following step:

Closing the connection between the user terminal and the at least one central control unit, Disabling the registration of the group of devices attached to the installation, the registration of the attachment of the at least one identifier of the at least one central control unit to the identifier of the installation being preserved.

The present invention also concerns a computer program product comprising code instructions arranged to implement the steps of a method as previously described, when said program is executed by a processor of a user terminal.

The present invention also concerns a method for registering a central control unit belonging to an installation; the method being executed by a management unit and comprising the following steps:

Receiving a registration message coming from a user terminal comprising an identifier of an installation and at least one identifier of a central control unit;

Creating or updating an entity representative of the installation corresponding to the identifier of the installation, which representative entity is associated with a group comprising the at least one identifier of a central control unit.

According to an aspect of the invention, the registration method further comprises the following step:

Receiving a topology description message coming from a user terminal comprising a description or an update of a description of a group of devices attached to the identifier of the installation; and Attaching the entity representative of the home automation installation of the group of devices attached to the identifier of the installation.

According to an aspect of the invention, the registration method further comprises the following step:

Receiving of a topology description message coming from a central control unit attached to the identifier of the installation comprising a description or an update of a description of a group of devices attached to said central control unit; and Updating a group of devices attached to the representative entity on the basis of the description or of the update of a description of the group of devices attached to said central control unit.

The present invention also concerns a computer program product comprising code instructions arranged to implement the steps of a method as previously described, when said program is executed by a processor of a management unit.

The different incompatible aspects defined above may be combined.

BRIEF DESCRIPTION OF THE DRAWINGS

The invention will be better understood using the detailed description shown hereinafter with reference to the appended drawing in which.

In the detailed description which follows of the figures defined hereinabove, the same elements or the elements meeting identical functions will keep the same references in order to simplify the understanding of the invention.

DETAILED DESCRIPTION

Figure 1:
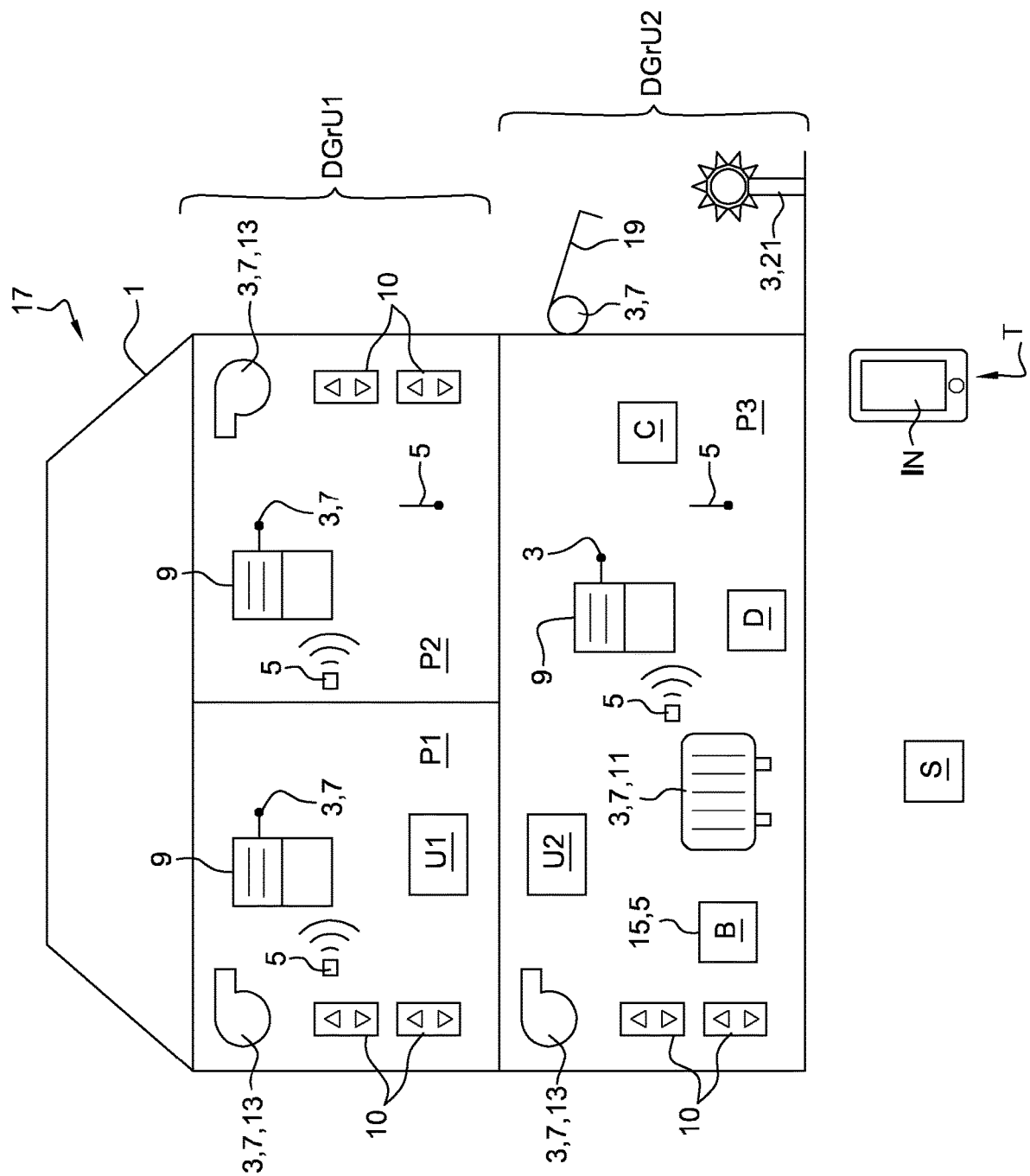
FIG. 1 is a schematic view of a building and of a home automation installation in accordance with an embodiment of the invention.

As illustrated in FIG. 1, a building 1 comprises as example three parts P1, P2, P3. The building 1 also comprises home automation equipments 3 and sensors 5.

Home automation equipment 3 may be an actuator arranged to displace or adjust an element of the building 1, for example an actuator 7 to displace a roller shutter 9 or a terrace awning 19, or a regulation system 10 for a heater 11 or an aeraulic system 13. Home automation equipment 3 can also be a lighting, such as for example a terrace outdoor lighting 21 or a lighting control system, an alarm system, or even a video camera, in particular a video surveillance camera.

The home automation installation 17 can also comprise a control point 15 of an actuator 7, such as a wireless control box B for the roller shutter 9.

The home automation installation 17 may comprise one or more sensor(s) 5, in an integrated manner to an actuator 7, a control point 15 or even the control box B, or independently to these elements. A sensor 5 can, in particular, be arranged to measure a physical unit, for example a temperature sensor, a sunlight sensor or a humidity sensor. Sensors 5 of the position of home automation equipment 3 of the building 1 such as, for example, sensors of the open state of a roller shutter 9 or sensors of the position of a leaf opening such as a window, motorized or not, may also be provided. The home automation installation can also comprise one or more presence sensor(s).

A home automation equipment 3 and a sensor 5 are thus to be considered as units having available information on observed real states of elements of the building 1 and being capable of sharing this information with other elements of the home automation installation 17.

The home automation equipment 3 and the sensors 5 can have access to any measurable physical unit, such as the temperature of each part P1, P2, P3 or a state of an element of the building 1, such as the state of opening of a roller shutter 9, the state of an alarm, etc.

Hereinafter, we will use the home automation device or device D designation indifferently to designate sensors or home automation equipment, or even parts of home automation equipment 3 or of sensors 5.

The home automation installation 17 comprises one or several central control unit(s) U1, U2. In particular and as example, two central control units U1, U2 are shown in FIG. 1.

Each central control unit U1, U2 is arranged to control and/or monitor a portion of the devices D of the installation 17 forming a group DGrU1, DGrU2. As example, in FIG. 1, the central control unit U1 is in charge of the devices D arranged in the rooms P1 and P2 of the first floor of the building, whereas the central control unit U2 is in charge of the devices D arranged in the room P3 in the ground floor of the building and of the external devices.

In particular, the control and/or monitoring is carried out remotely, in particular by using a wireless communication protocol, for example a radio communication protocol. Each central control unit U1, U2 is arranged to bring together the set of data coming from the devices D of its group DGrU1, DGrU2 and to process this data.

The devices D forming a portion of a group DGrU1, DGrU2 belong to a local area network managed by a central control unit U1 or U2 within the home automation installation and communicate according to a local communication protocol with the central control unit U1 or U2. They have a local address in this network. The logic devices D may be modeled as nodes or endpoints in the local area network. The local addressing system can be hierarchical or flat, the address format can be numeric or alphanumeric.

Figure 2:
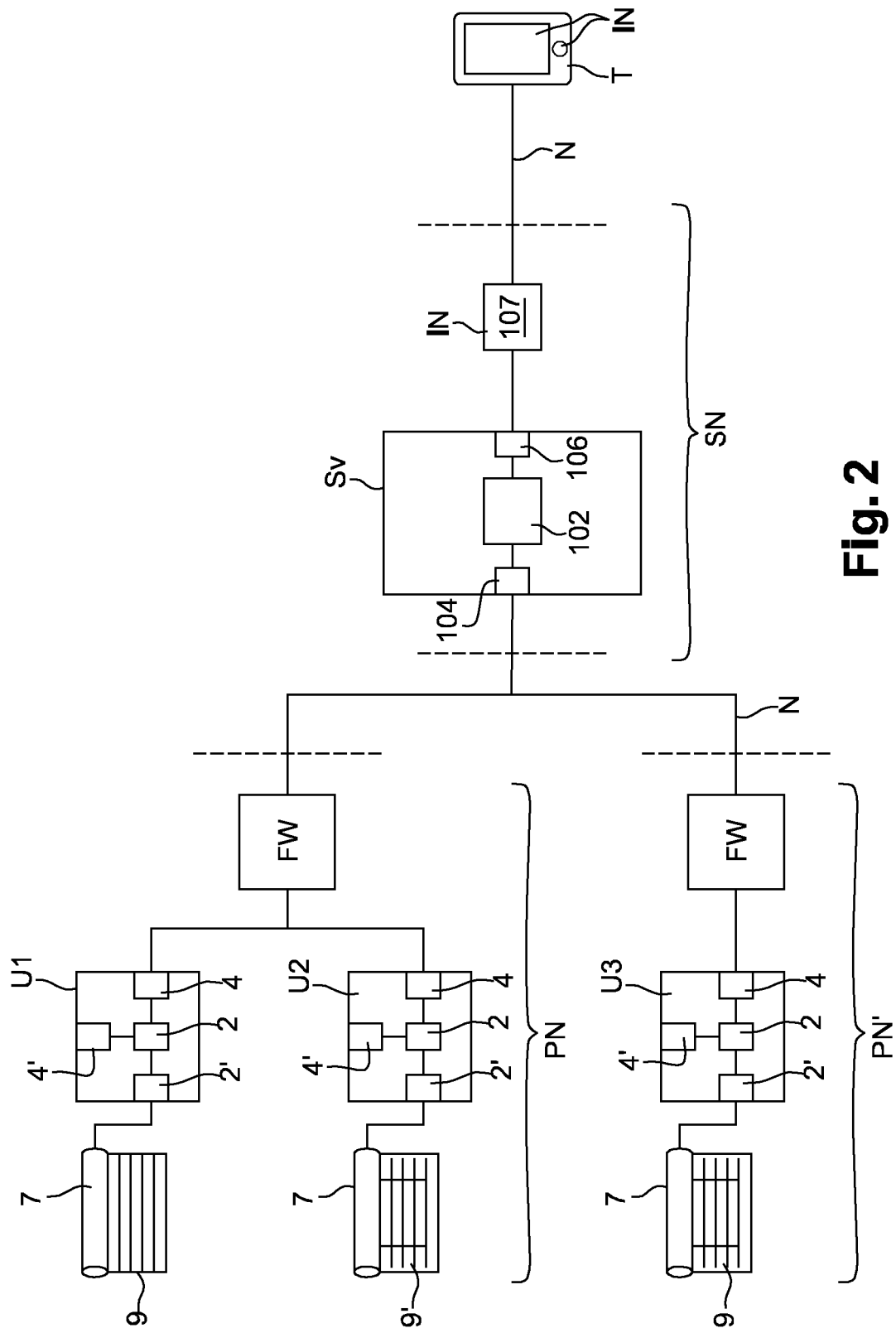
FIG. 2 is a diagram presenting an architecture of a system comprising the home automation installation illustrated in FIG. 1 as well as a server intended to be connected to a user terminal.

As shown in FIG. 2, the central control unit U is arranged to communicate with a server Sv.

The central control units U1, U2, U3 are arranged on a private network PN, PN', the access of which is generally protected by a firewall FW. In particular, in the example represented in FIG. 2, two central control units U1, U2 are arranged on a first private network corresponding to a first home automation installation, whereas a third central control unit U3 is arranged on a second private network PN', independent of the private network PN corresponding to a second home automation installation. The server Sv is also arranged on a private network SN. The private network PN is connected to a wide area network N, for example Internet. Of course, the server Sv is arranged to communicate with a set of such central control units U. Hereinafter, we will describe one of these units.

A central control unit U comprises a processing unit 2 arranged to contain and execute a first computer program. As an example, the processing unit 2 comprises a processor, a storage flash memory as well as a random-access memory, and an Ethernet chip.

The central control unit U further comprises at least one communication module 2' intended to monitor and/or control home automation equipment 3 and/or sensors 5, the home automation equipment 3 may be actuators 7, lightings 21, an alarm system, or a video camera.

As example, as shown in FIG. 2, the communication module 2' allows monitoring and controlling at least one actuator 7 of a movable element of the building 1, such as a roller shutter 9, or of an orientable sunshade 9' or of other actuators 7 or lightings 21, as previously described with reference to FIG. 1.

As example, the communication module 2' may be arranged to implement for example one or more of the protocols Z-Wave, EnOcean, IO Homecontrol, Somfy RTS, KNX, MODBUS, Wavenis, Philips HUE.

According to another possibility, for example in the context of alarm systems, the central control unit may be integrated into the home automation device.

The reception of information from a sensor 5 providing presence information of a user or values of the surrounding parameters, such as the temperature, the humidity and the brightness, is also provided. Similarly, the central unit U may enable monitoring and/or controlling an alarm system.

Each central control unit U further comprises a communication module 4 with the server Sv. The server Sv allows the remote control and/or monitoring and comprises one or more processing unit(s) 102 arranged to contain and execute a second computer program.

Each central control unit U further comprises a communication module 4' for communicating according to a local communication protocol, for example Bluetooth or Wifi, with a mobile communication terminal or user terminal T. The mobile communication terminal T may contain and execute an application software APP.

In some applications, a central control unit U may communicate with the management unit through an intermediate server, for example of a third-party service provider, whose intermediate server offers a service interface or API. The server Sv further comprises at least one communication interface 104 intended for the communication with the central unit U.

The server Sv may also comprise a communication interface 106 intended for the communication with a control and/or monitoring interface IN allowing a user to remotely monitor the home automation installation.

It should be noted that the term server is a logical designation which can cover the use of several physical servers to distribute the computer processing load to be carried out.

The control and/or monitoring interface IN comprises, for example, a web server 107 and a mobile communication terminal T communicating via the wide area network N. The mobile communication terminal T can be, for example, a smartphone or a tablet. The mobile communication terminal T may be the same or a terminal of the same type as that with which the central control unit U locally communicates by means of the communication module 4', or a different terminal. We will indifferently designate these mobile terminals by the reference T.

The control and/or monitoring interface IN comprises a processor which can be arranged at the web server 107 and/or the mobile communication terminal T.

The control and/or monitoring IN interface processor is arranged to use a third computer program. This third computer program is in turn arranged to execute a downloadable application.

The mobile communication terminal T comprises a data input device and a display device, for example in the form of a part of a touch control of a screen of the terminal T and in the form of one or more button(s) of the terminal T.

FIGS. 1 and 2 describe an installation 17 which comprises a set of devices D and a plurality of central control units U1, U2, arranged within the same dwelling, the same building or the same physical location.

According to another possibility, an installation 17 in the context of the invention may comprise home automation devices arranged on a plurality of locations, with at least one central control unit on each of these locations to which are attached the home automation devices, the central control units U of the installation being placed under the control of a user.

As example, such an installation may comprise a set of home automation devices constituted by heating systems distributed within a set of dwellings or tertiary premises, attached to a set of central control units U, the set of home automation devices being intended to be controlled by a specific user in charge of the heating for said set of dwellings or tertiary premises.

Figure 3:
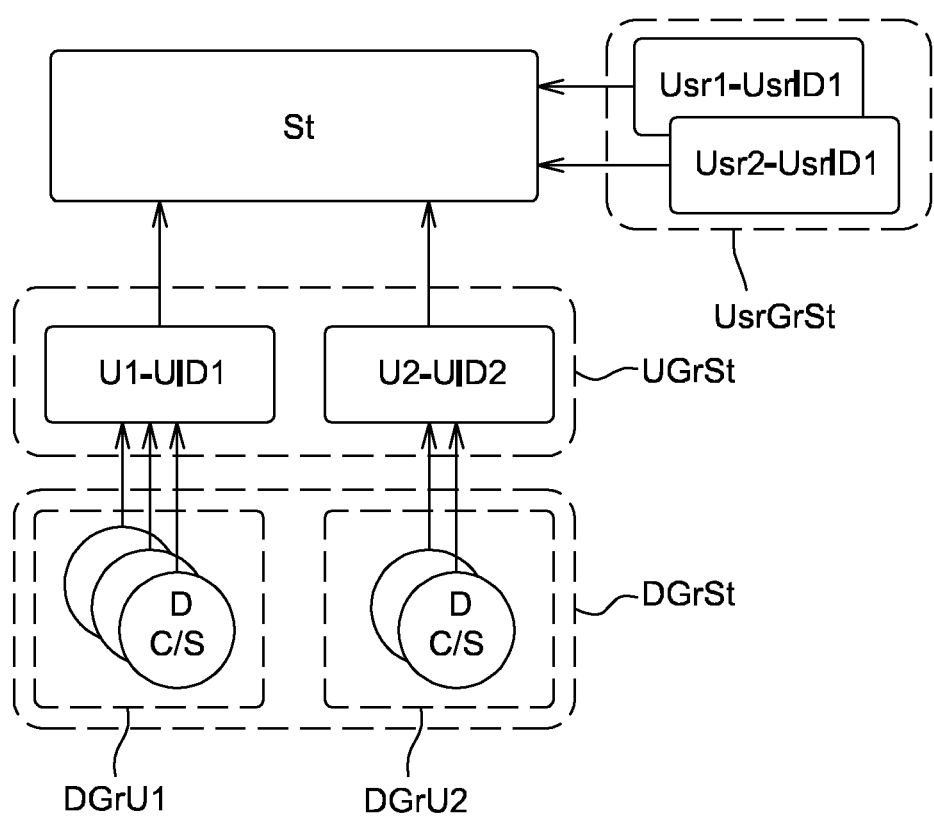
FIG. 3 is a diagram representing the relationships between an entity representative of a home automation installation, the central control units and the devices of the home automation installation.

We will now describe, with reference to FIG. 3, the representation of the installation 17 by a representative entity St on the server Sv, in the case where the installation comprises multiples central control units U.

The system according to the invention attaches several central control units U to one single object St representing an installation 17 by a configuration at the level of the server Sv.

Thus, the server Sv may present the installation 17 to the user as one single set of devices D, for example via an Application Programming Interface or API, in which each device D may accept a determined set of commands C or present state variables S.

The server Sv may also use an abstraction system or layer for the commands C and the state variables S in order to propose an API which is more generic and independent of the communication protocol used by a given device D.

The identification of the representative entity St of the installation may be carried out, according to one embodiment, by any one of the identifiers UID of any of the central control units U present within the installation, by an identifier of the installation or of the user.

Thus, in order to simplify the designation of an installation in the public APIs, all it needs is that the users of these APIs provide a unique identifier attached to the representative entity St of the installation 17.

Internally to the server, a unique identifier of the representative entity St of the installation 17 may exist to facilitate the implementation.

Thus, the representative entity St may be associated with a list or group of devices DGrSt bringing together the devices contained within the different groups DGrU1, DGrU2 attached to each central control unit U1, U2, and with a group UGrSt of the identifiers UID of the concerned central control units U. The devices are identified by a unique identifier. A representative entity of a home automation installation may be associated with a given user Usr1, identified by an identifier UsrID, corresponding for example to a login and password combination or with a given group of users UsrGrSt.

An example of an embodiment of a unique identifier of a device DURL will now be described.

According to this embodiment, the unique identifier of a device DURL comprises information on:
- The local native protocol of the home automation device ID,
- The communication path to the device D, including the intermediate central control units U and the ending addresses to pass through, arranged or not in a hierarchical topology;
- A sub-system identifier subsystemId if the device comprises several functional sub-sets or sub-systems that can be separately addressed. The devices which comprise only a functional set do not have identification extension of a sub-system.

Thus, the form of the unique identifier of a device DURL may be as follows:

<protocol>://<gatewayId>/<rawDeviceAddress>(#<subsystemId>)

In which the following fields are present:
protocol: identifier of the native device local protocol;
gatewayId: identifier of the first central control unit U, for example a serial number or a unique identifier.
rawDeviceAddress: a simple path or at several levels. Its meaning and format depend on the addressing scheme of the local communication protocol of the device D.
subsystemId: this optional field indicates an identification, for example a row of the sub-system (for example starting from 1), if such a sub-system is present.

EXAMPLES 1. knx://0201-0001-1234/1.1.3

This device unique identifier DURL corresponds to a device D communicating with the protocol KNX with an individual address 1.1.3 accessible by the central control unit U bearing the identifier #0201-0001-1234.

2. io://0201-0001-1234/145036#2

This unique identifier of a device DURL corresponds to a sub-system bearing the number 2 associated with a device D communicating by the homecontrol protocol with a radio address 145036 accessible by the central control unit U bearing the identifier #0201-0001-1234.

The manipulation of data ralting to the devices D at the server Sv are made by a process or execution service ES. In order to store data relating to different device instances D mentioned above, the execution service can have access to an instance database IDB. Of course, these different types of instances can also be stored separately. Moreover, database here means an appropriate storage mode for a set of instances which can be stored in a list, a tree or tables or any other appropriate data structure.

Figure 4:
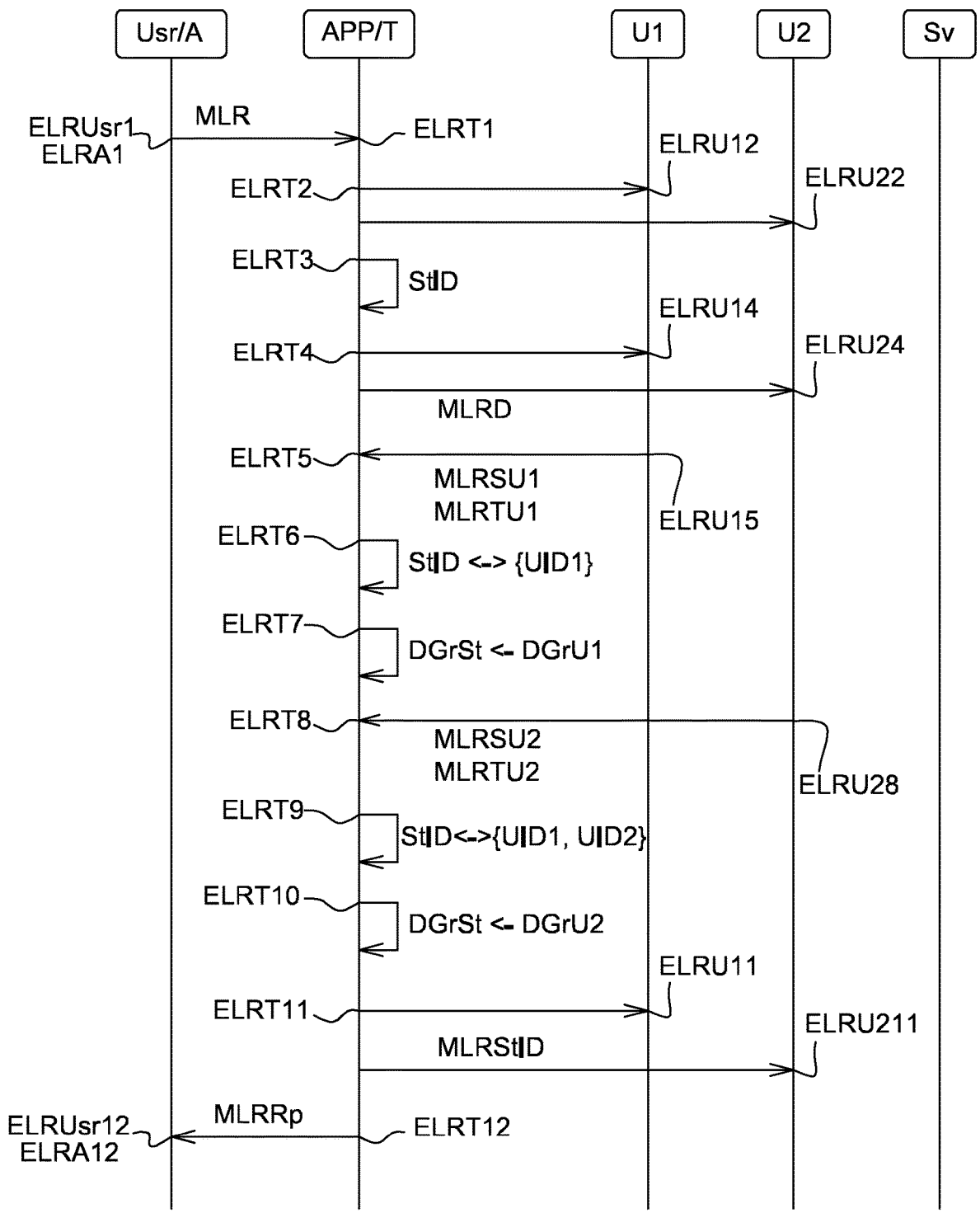
FIGS. 4 and 5 are diagrams illustrating a mode of implementation of a method for registering a central control unit of a home automation installation according to the invention.

A registration method of a central control unit U belonging to ahome automation installation 17 of a building 1 will now be described with reference to FIG. 4. We will assume here that the method is performed by a mobile user terminal T, for example executing an application APP.

In a first step ELRT1, a message MLR or an initiation instruction of the registration is received from for example a user or a third party application which transmits or communicates this message or this instruction respectively in a step ELRUsr1 or ELRA1. The user may have beforehand launched the application APP and created or opened his user account. He informed his identifiers UsrID, for example a login and password.

The terminal is connected in a prior step ELRT2 locally individually to the central control units U of the installation 17, by using a local protocol, in particular a wireless protocol, such as for example a protocol of the Bluetooth, Zigbee, or even Wifi type, either directly or via an access point which can integrate in this case a protocol gateway function (for example: Ethernet to WiFi/Bluetooth/Zigbee). The central control units U1 and U2 accept this connection respectively in steps ELRU21 and ELRU22. We will call later by terminal indifferently the terminal of the application APP executed on the terminal T.

The steps ELRT1 and ELRT2 can be switched, the connection can be established after receiving the initiation instructions of the registration.

In a third step ELRT3, an installation identifier StID is generated. The identifier StID of the home automation installation 17 may be associated with a group UsrGrSt comprising at least one identifier UsrID1 of a user.

In a fourth step ELRT4, a discovery message MLRD to the central control unit U1, U2 is sent, which is received by said central control units in the respective steps ELRU14 and ELRU24. According to one embodiment, the discovery message may correspond to a protocol of the type «Bonjour» SSDP, UPNP.

During the discovery phase, the methods executed by the central control units and by the terminal can be launched in a coordinated manner by the user, for example by pressing a dedicated button of the central control unit U1, U2 before launching the application APP on the terminal T. This pressing puts the central control unit U1, U2 in a «discovery» mode for a time interval, during which it responds to the messages sent by the terminal T. This procedure secures the pairing, by the proximity between the user and the central control unit U1, U2; and simplifies the transfer of identification data, because the user must not manually enter the serial numbers and certificates which are long enough. Indeed, the identifiers are unique for each central control unit U1, U2 produced by a manufacturer.

Subsequently, the first central control unit U1 sends, in response to the discovery message MLRD, in a step ELRU15, a reporting message MLRSU1 in connection with a first unique identifier UID1 of said first central control unit U1, which is received by the terminal in a step ELRT5. The first central control unit U1 also sends a topology description message MLRTU1 comprising a description of a group of devices DGrU1 attached to the central control unit U1.

In a step ELRT6, the procedure is the attachment of the first identifier UID1 of the first central control unit U1 to the identifier StID of the installation and the local registration of this attachment in the application APP on the terminal T;

In a step ELRT7, the procedure is the registration of a group of devices DGrU1 in connection with the identifier StID of the installation in a device group attached to the installation DGrSt.

The second central control unit U2 also sends, in response to discovery message MLRD, in a step ELRU28, a reporting message MLRSU2 in connection with a second unique identifier UID2 of said second central control unit U2, which is received by the terminal in a step ELRT8. The second central control unit U2 also sends a topology description message MLRTU2 comprising a description of a group of devices DGrU2 attached to the central control unit U2.

For each device D, a central control unit may also communicate commands and parameters associated with these devices. The commands can be deduced by the terminal from the type of device or present by default in the application on the terminal T, the list of devices used to validate the use of these commands, if a device of this type is present.

In a step ELRT9, the procedure is the attachment of the second identifier UID2 of the second central control unit U2 to the identifier of the installation StID and the local registration of this attachment in the application APP on the terminal T;

In a step ELRT10, the procedure is the registration of the group of devices DGrU2 in connection with the identifier StID of the installation in a device group attached to the installation DGRST.

The identifier of the installation StiID of the home automation installation 17 is associated with a group UGrSt comprising at least the identifiers UID1, UID2 of the first central control unit U1 and the second central control unit U2.

Similarly, the identifier StID of the home automation installation 17 is associated with a group of devices DGrSt grouping the devices contained in at least the first group of devices DGrU1 attached to the first central control unit U1 and at least the second group of devices DGrU2 attached to the second central control unit U2.

Thus, the devices are considered as attached to the same identifier of an installation, a group which brings together all the installation devices attached indifferently to the first or the second central control unit which can be communicated to a user or a third party application.

It is possible to provide an additional step ELRT11 in which a message MLRStID comprising the identifier StID of the home automation installation 17 is sent to the central control units U1 and U2 attached to said identifier StID, with a view to its registration on electronic control units U1, U2 in respective steps ELRU111 and ELRU211.

At this stage, the local registration on the terminal can be considered finished.

A feedback to the user USr or to a third party application A can be communicated in a step ELRT12 as a response message MLRRp that they receive in a step ELRUsrI2 or ELRA12 respectively.

It is also possible to proceed for the terminal, in the same step ELRT12 or subsequently to a presentation on the interface of the terminal T, an interface allowing controlling or monitoring the devices belonging to the group DGrSt, regardless of their attachment to a central control unit U1 or U2.

Figure 5:
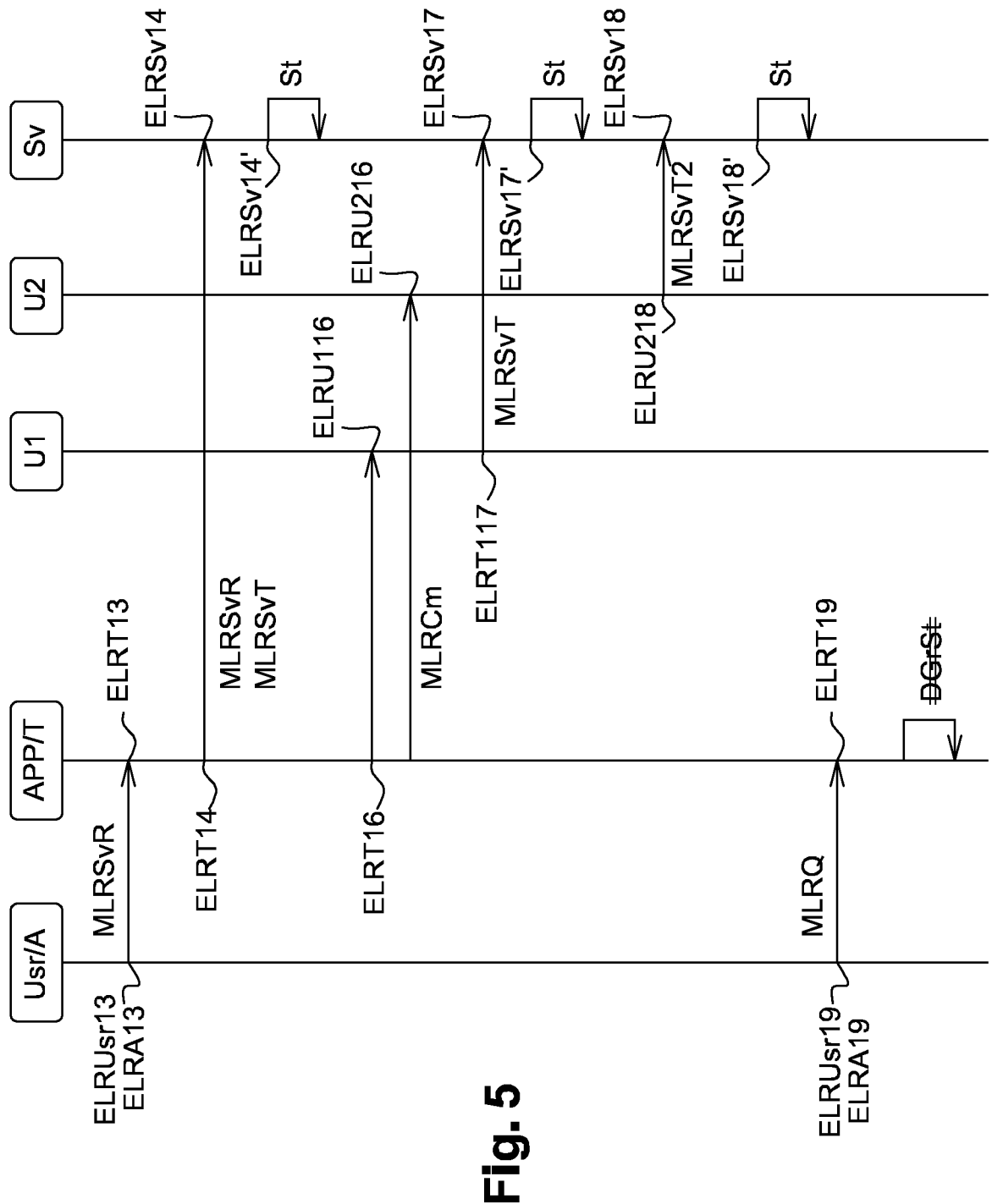

The local registration can be transmitted to the server Sv by performing the following steps, described in FIG. 5.

This propagation of information can be automatic, or requested by a user or a third party application in a step ELRUsr13 or ELRA13, the terminal receiving this instruction or this message MLRSvR in a step ELRT13.

The terminal T sends in a step ELRT14 a registration request message MLRSvR to the Server Sv comprising the identifier StID of the installation and the identifiers of associated the central control units UID1, UID2 included in the group UGrSt, the server receiving this message in a step ELRSv12. The server can create a representative entity St corresponding to the defined home automation installation. The terminal T can also send the data relating to the devices attached to the StID of the group DGrSt for the constitution of this representative entity.

Moreover, the terminal T sends in a step ELRT15 a communication request message MLRCm to the central control units U1 and U2 attached to the identifier of the identifier StID of the installation, with a view to establishing a communication by the central control unit U to the server Sv to communicate to the server Sv information relating to said central control unit U and optionally to a description of the group of devices DGrU1, DGrU2 attached to the central control unit U1, U2, but also with view to collecting commands coming from the server Sv.

In particular, this step may correspond to a request for establishment of TCP/IP connection of the central control units U to the server Sv, by order of the user.

The order of steps ELRT14 and ELRT15 is not important.

The effective realization of the communications between the central control units U1, U2, is represented in the drawing by the steps ELRU116/ELRSv16 and ELRU217/ELRSv17 respectively. During these communications, the central control units send to the server applicative messages containing their identifier UID1 or UID2, and optionally the list of driven devices through it, possibly the commands supported by each device/device type and the state parameters/variables associated with these devices.

To reinforce the security of the establishment of the representative entity St corresponding to the defined home automation installation, the server Sv can condition this creation by the reception for a predefined time interval of a message MLRSvR coming from the terminal T, and applicative messages coming from the central control units U1, U2.

Updates of information concerning the devices associated with the installation are accordingly performed by messages which we will be called generically as topology description message MLRSvT. This may be about the addition or the deletion of a device attached to a central control unit, the parameters changed during a connection of the user in local mode, etc. Thus, a user who connects via Internet to his home automation installation via the server Sv has an updated «view» of the installation.

When disconnecting the application, requested by the user in a step ELUsr18/ELRA18 by a query or an output instruction MLRQ, the terminal T proceeds, in a step ELRT18 to the closing of the connection between the user terminal T and the central control units U1, U2, and to the invalidation of the registration of the device group attached to the installation DGrSt, the registration of the attachment of the at least one identifier UID of the at least one central control unit to the identifier of the installation of the StID being preserved.

When a new connection to the application, a new discovery will be performed by the application, but already knowing the identifiers UID1, UID2 of the central control units attached to the installation identifier StID.

It will suffice that the central control units return the topology description messages MLRTU1, MLRTU2. These arrangements serve to have an updated view of the installation.

The invention claimed is:

1. A method for registering at least one central control unit belonging to a home automation installation; the method being executed by a user terminal and comprising the following steps:
   i. establishing a connection between the user terminal and the at least one central control unit;
   ii. creating an installation identifier, wherein the installation identifier is associated with a group comprising at least one identifier of a user;
   iii. sending a discovery message by the user terminal to the at least one central control unit;
   iv. receiving by the user terminal at least one reporting message transmitted by the at least one central control unit for the installation in connection with a unique identifier of the at least one central control unit; and v. registering in an application of the user terminal an attachment of the unique identifier of the at least one central control unit to the installation identifier.

2. The registration method according to claim 1, further comprising the following step:
receiving at least a topology description message comprising a description of a group of devices attached to the at least one central control unit;
registering the group of devices in connection with the installation identifier in a group of devices attached to the installation.

3. The registration method according to claim 1, wherein the at least one central control unit comprises a first central control unit and a second central control unit, the method comprising at least the following steps:
a first reception step of a first reporting message from the first central control unit for the home automation installation in connection with a first unique identifier of the first central control unit, and
a second reception step of a second reporting message transmitted by the second central control unit for the home automation installation in connection with a second unique identifier of the second central control unit;
and at least the following steps:
a first step of registering an attachment of the first unique identifier of the first central control unit to the installation identifier;
a second step of registering an attachment of the second unique identifier of the second central control unit to the installation identifier;
the installation identifier of the home automation installation being associated with a group comprising the first unique identifier of the first central control unit and the second unique identifier of the second central control unit.

4. The registration method according to claim 3, comprising at least the following steps:
a first reception step of a first topology description message comprising a description of a first group of devices attached to the first central control unit; and
a second reception step of a second topology description message comprising a description of a second group of devices attached to the second central control unit;
and at least the following steps:
a first step of registering the first group of devices in connection with the installation identifier in a group of devices attached to the home automation installation;
a second step of registering a second group of devices in connection with the installation identifier in the group of devices attached to the home automation installation;
the installation identifier of the home automation installation being associated with the group of devices attached to the home automation installation grouping devices contained in at least the first group of devices attached to the first central control unit and at least the second group of devices attached to the second central control unit.

5. The registration method according to claim 1, further comprising the following step:
sending a message comprising the installation identifier of the home automation installation to the at least one control unit attached to the installation identifier.

6. The registration method according to claim 1, wherein the installation identifier of the home automation installation is associated with a group comprising at least one identifier of a user.

7. The registration method according to claim 1 comprising at least the following step:
sending a registration message to a management unit comprising the installation identifier and at least one identifier of the at least one central control unit.

8. A registration method according to claim 1 further comprising the following steps:
sending to a management unit of a topology description message comprising a description of a group of devices attached to the installation identifier.

9. The registration method according to claim 8, further comprising the following step:
sending a communication request message to the at least one central control unit attached to the installation identifier to establish a communication between the at least one central control unit and the management unit, in order to provide the management unit with at least the identifier from the at least one central control unit and a description of a group of devices attached to the at least one central control unit.

10. The registration method according to claim 1, further comprising the following steps:
closing the connection between the user terminal and the at least one central control unit.

11. A non-transitory computer readable medium comprising code instructions arranged to implement the steps of a method according to claim 1, when the program is executed by a processor of a user terminal.

12. The registration method according to claim 2, wherein the at least one central control unit comprises a central control unit and a second central control unit, the method comprising at least the following steps:
a first reception step of a first reporting message from the first central control unit for the home automation installation in connection with a first unique identifier of the first central control unit, and
a second reception step of a second reporting message transmitted by the second central control unit for the home automation installation in connection with a second unique identifier of the second central control unit;
and at least the following steps:
a first step of registering an attachment of the first unique identifier of the first central control unit to the installation identifier;
a second step of registering an attachment of the second unique identifier of the second central control unit to the installation identifier;
the installation identifier of the home automation installation being associated with a group comprising at least the first unique identifier of the first central control unit and the second unique identifier of the second central control unit.

13. The registration method according to claim 12, comprising at least the following steps:
a first reception step of a first topology description message comprising a description of a first group of devices attached to the first central control unit; and
a second reception step of a second topology description message comprising a description of a second group of devices attached to the second central control unit; and
at least the following steps:
a first step of registering the first group of devices in connection with the installation identifier in the group of devices attached to the home automation installation;

a second step of registering the second group of devices in connection with the installation identifier in the group of devices attached to the home automation installation;

the installation identifier of the home automation installation being associated with the group of devices attached to the home automation installation grouping devices contained in at least the first group of devices attached to the first central control unit and at least the second group of devices attached to the second central control unit.

14. The registration method according to claim 2, further comprising the following step:

sending a message comprising the installation identifier of the home automation installation to the at least one control unit attached to the installation identifier.

15. The registration method according to claim 3, further comprising the following step:

sending a message comprising the installation identifier of the home automation installation to the at least one control unit attached to the installation identifier.

\* \* \* \* \*